Patented Mar. 15, 1938

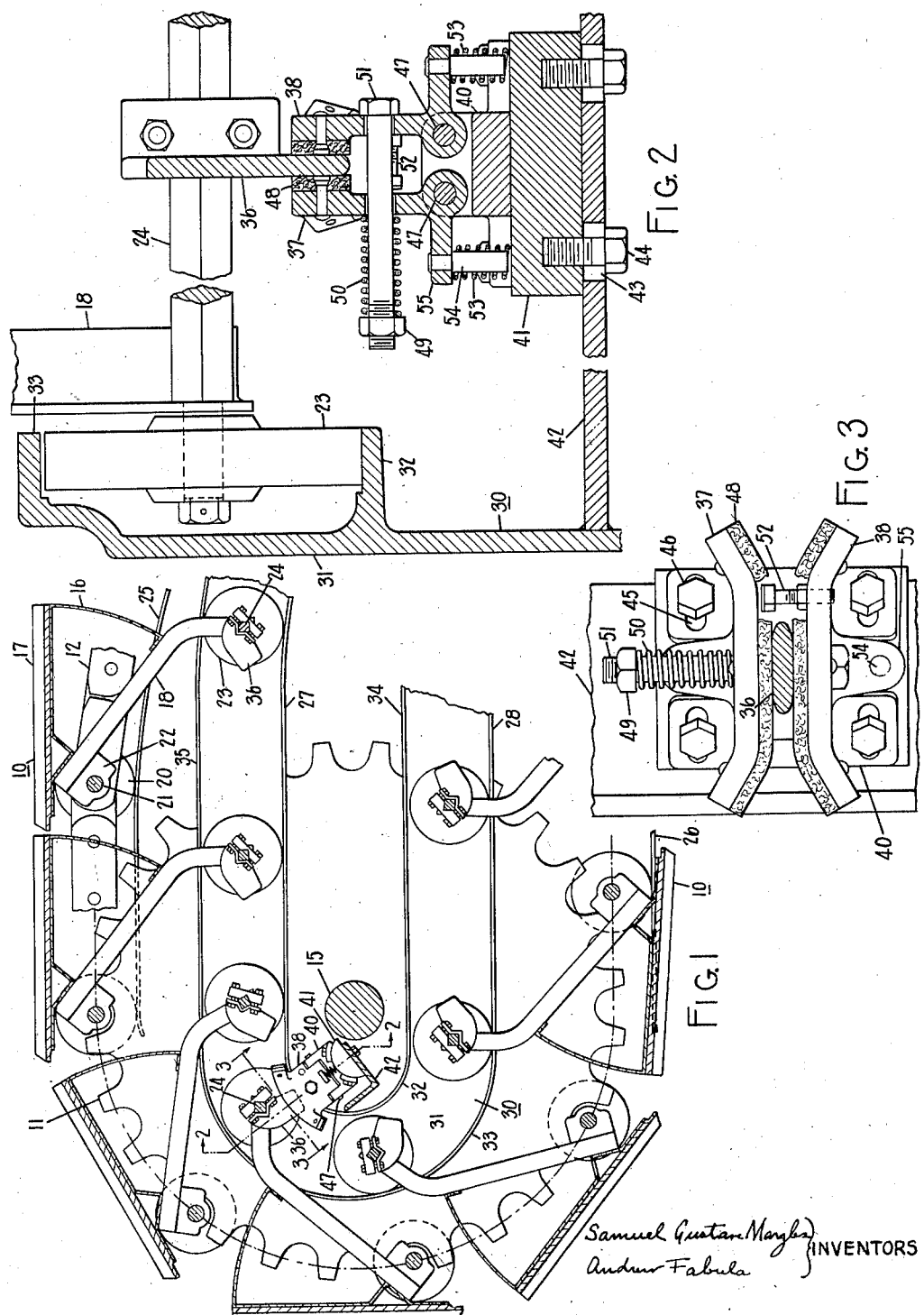

2,111,433

UNITED STATES PATENT OFFICE 2,111,433

MOVING STAIRWAY

Samuel Gustave Margles, Brooklyn, N. Y., and Andrew Fabula, Bayonne, N. J., assignors to Otis Elevator Company, New York, N. Y., a corporation of New Jersey Application March 1, 1937, Serial No. 128,376

7 Claims. (Cl. 198—16)

The invention relates to moving stairways.

Moving stairways comprise an endless series of steps which are moved from one landing to another for the purpose of conveying passengers. The steps are connected together by means of sprocket chain, known as running gear chain. It has been the practice for a considerable number of years to provide a running gear chain on each side of the stairway. Also, each step is provided on each side with a chain wheel, associated with the running gear chain, and with a trailer wheel. Guides are provided at each end of the stairway for guiding the trailer wheels around the bend. Each guide comprises an inner curved track and an outer curved track. The space between the inner and outer tracks includes enough clearance to enable the trailer wheels to rotate in going around the bend. As a result of this clearance, the trailer wheels of each step, as they pass around the bend, fall from one track to the other as the center of gravity of the step shifts from one side to the other of a vertical plane through the chain wheel axle. This makes a slapping noise which is undesirable.

It is the object of the invention to eliminate noise incident to the transfer of the trailer wheels from one run to the other at the end of the stairway.

The invention involves damping the movement of the trailer wheels as the transfer from one curved track to the other is made, thereby effecting this transition gradually and with a minimum of noise.

The invention will be described as applied to a moving stairway construction in which the trailer wheels for each step are mounted on an axle which extends across the stairway. In carrying out the invention as applied to such construction, a friction device is provided at one or both ends of the stairway and is positioned to cooperate with a member associated with each trailer wheel axle to exert a drag thereon as the transition of the trailer wheels from one curved track to the other is made.

Features and advantages of the invention will be apparent from the following description and appended claims.

In the drawing:

Figure 1 is a side view in vertical section of the upper portion of a moving stairway embodying the invention, parts being omitted in order that the construction may be readily seen;

Figure 2 is an enlarged fragmental view taken along the line 2—2 of Figure 1, illustrating details of the friction device; and Figure 3 is an enlarged fragmental view taken along the line 3—3 of Figure 1, also illustrating details of the friction device.

Referring to Figure 1, the stairway illustrated is of a present day commercial construction and is reversible. It comprises an endless series of steps 10 driven at the upper end of the stairway by means of sprocket wheels through running gear chains, a sprocket wheel and chain being arranged on each side of the stairway. A sprocket wheel 11 and running gear chain 12 are illustrated for one side of the stairway. The sprocket wheels are mounted on and driven by the main drive shaft 15, driven in turn by driving mechanism (not shown).

Each step comprises a step frame 16 upon which the tread 17 is mounted. The frame is mounted on brackets 18, one on each side of the stairway. The chain wheels 20 for the step are mounted on an axle 21 extending across the stairway through opposite chain rollers in the running gear chains. The axle extends into axle blocks 22 secured to one end of step bracket 18 at each side of the stairway. The trailer wheels 23 for the step are mounted on an axle 24 which also extends across the stairway and is supported by the other ends of step brackets 18.

An upper run track 25 and a return run track 26 are provided on each side of the stairway for the chain wheels. When the stairway is ascending, the chain wheels run on the upper run tracks until a position above the main drive shaft is reached, and thus support the steps up to this position. As this position is reached, the sprocket wheels 11 mesh with the rollers in the running gear chains through which the chain wheel axle extends to carry the step around the bend to a point below the main drive shaft where the chain wheels run onto their return run tracks. The reverse of the above described operation takes place when the stairway is descending.

An upper run track 27 and a return run track 28 are provided on each side of the stairway for the trailer wheels. A channel shaped semi-circular guide 30 is provided on each side of the stairway for guiding the trailer wheels as they pass around the bend from one run to the other. This guide comprises a back plate 31 having concentric semi-circular guide flanges extending therefrom to form inner and outer tracks 32 and 33 respectively. The inner track 32 is a continuation of upper run trailer wheel track 27 at the top and of an up thrust track 34 at the bottom. Similarly, the outer track 33 is a continuation of return run trailer wheel track 28 at the bottom and of an up thrust track 35 at the top.

Owing to the running clearance provided for the trailer wheels between the inner tracks 32 and outer tracks 33, the wheels, in passing around the bend when the stairway is ascending, swing from the inner tracks to the outer tracks as the center of gravity of the step passes to the left of the vertical plane through the chain wheel axle, as indicated in Figure 1. Similarly, when the stairway is descending, the trailer wheels, in passing around the bend, swing from the outer tracks to the inner tracks as the center of gravity of the step passes to the right of this plane. To prevent any slapping noise as the trailer wheels fall against the other track, a friction device is positioned to cooperate with a member on each trailer wheel axle to exert a drag thereon as the transition takes place. Details of this mechanism are illustrated in Figures 2 and 3.

The trailer wheel axles 24 are square in cross section between the step brackets. A tongue 36 is clamped to each trailer wheel axle between the brackets to cooperate with the friction device. The friction device comprises two friction shoes 37 and 38 pivotally mounted on a supporting bracket 40 in position for the tongues to pass between them. Supporting bracket 40, in turn, is mounted on a supporting block 41 secured to an angle iron 42 extending between and secured to back plates 31.

The angle iron is provided with slots 43 to receive screws 44 for securing the supporting block to the angle, these slots permitting lateral adjustment of the friction device. Supporting block 41 is semi-cylindrical and the base of supporting bracket 40 has the same curvature. This base is formed with four feet which are provided with slots 45 to receive the mounting screws 46 for the bracket, these slots permitting adjustment to obtain the desired angular position of the friction shoes. The device is set so that the tongues are midway through the jaws as the point is reached where the center of gravity of the steps shifts.

Above the base, the supporting bracket is U-shaped, the legs of the U supporting the pivot pins 47 for the friction shoes. The ends of the shoes are flanged outwardly to receive the tongues 36. The shoes are biased to position to receive the tongues midway between them by means of springs 53, these springs yielding whenever a tongue does not enter the jaws centrally. Springs 53 are arranged on pins 54 secured to lugs 55 formed on the shoes, each of these pins being elongated to engage block 41 in case the spring 53 arranged thereon breaks, thereby preventing any serious misalignment of the jaws with respect to the tongues. Each shoe is faced with brake lining 48. The shoes are biased toward each other by a spring 50 arranged on bolt 51 extending through opposed apertures in the shoes. Adjustment of the pressure exerted by spring 50 to obtain the desired pressure of the shoes on the tongues is provided by the nut 49 on bolt 51, the spring being of such length as to maintain this pressure substantially constant as the linings on the brake shoes wear. An adjustable stop 52 is secured to shoe 38 to limit inward movement of the shoes.

In operation, assuming the stairway to be ascending as each pair of trailer wheels starts down around the bend, the tongue for these wheels enters between the jaws of the friction device. As the tongue is about half-way through the jaws, the center of gravity of the step shifts to the right of a vertical plane through the chain wheel axle. As this takes place, the trailer wheels tend to fall into engagement with the outer track 33. This engagement does not take place immediately, being delayed by the drag exerted on the tongue by the friction device. Thus, the transposition of the trailer wheels from the inner track to the outer track takes place gradually, the trailer wheels coming gently against the outer track, thereby minimizing noise due to the transition. The friction device operates in the same manner to dampen the transition of the trailer wheels from the outer track to the inner track when the stairway is descending, the tongue entering between the jaws shortly before the center of gravity shifts to the right of the vertical plane through the chain wheel axle and being maintained in between the jaws until the transition of the trailer wheels to the inner track has been completed.

The arrangement of the friction device at the lower landing has not been illustrated but it is to be understood that the construction may be the same. In certain moving stairways, the chain wheels are guided around the bend at the lower landing by track construction instead of a sprocket wheel, in which event no sprocket wheel shaft is provided. However, a shaft may be arranged across the stairway at the lower landing in such position that the friction device may be mounted directly on the shaft instead of the angle iron and semi-cylindrical mounting block arrangement illustrated. The friction device at the lower landing is positioned so as to exert a drag on the tongues as the transition of the trailer wheels from one curved track to the other takes place.

It is to be understood that friction devices of other constructions may be employed and arranged to cooperate with other members associated with the trailer wheels. Also, the invention is applicable to arrangements where the trailer wheels are mounted on stub axles instead of having the axles extend all the way across the stairway, as by providing a friction device on each side of the stairway and arranged to cooperate with a member associated with the stub axle or step bracket on each side of the stairway. The invention may be applied to other forms of moving stairway construction, the form chosen being shown for convenience of illustration. Also, it is applicable to one way stairways as well as reversible ones. In other words, the construction of the dampening device, its position and its manner of effecting a drag on the trailer wheels may be arranged to suit the particular installation, any arrangement which will dampen the movement of the trailer wheels from one track to the other as it passes around the bend at an end of the stairway being satisfactory.

Therefore, as many apparently widely different embodiments of this invention may be made without departing from the scope thereof, it is intended that all matter contained in the above description or shown in the accompanying drawing shall be interpreted as illustrative and not in a limiting sense.

What is claimed is:

1. A moving stairway comprising; a series of steps, each step having a trailer wheel; curved inner and outer tracks at an end of the stairway for guiding the trailer wheels as the steps pass around the bend from one run to the other, the distance between said tracks being greater than the diameter of said wheels, each wheel shifting from one track to the other due to the action of gravity on the step for which it is provided as the step reaches a certain point in going around the bend; and means for dampening the movement of each trailer wheel as said shift thereof from one track to the other takes place.

2. A moving stairway comprising; a series of steps, each step having a trailer wheel; curved inner and outer tracks at an end of the stairway for guiding the trailer wheels as the steps pass around the bend from one run to the other, said tracks being spaced to provide sufficient clearance for said wheels to roll thereon, each wheel shifting from one track to the other due to the action of gravity on the step for which it is provided as the step reaches a certain point in going around the bend; means associated with each of said trailer wheels and connected to the step for which the trailer wheel is provided; and means for exerting a drag on each of the first named means, as the step to which it is connected passes said point, to dampen the movement of the trailer wheel for that step as its shift from one track to the other takes place.

3. A moving stairway comprising; a series of steps, each step having a trailer wheel at each side thereof; a pair of semi-circular tracks at an end of the stairway on each side thereof for guiding the trailer wheels as the steps pass around the bend from one run to the other, the tracks of each pair being concentric and being spaced to provide sufficient clearance for said wheels to roll thereon, the wheels of each step shifting from one of their respective tracks to the other due to the action of gravity on the step as it reaches a certain point in going around the bend; and means carried by each step and cooperating with stationary means to retard said shifting of said wheels.

4. A moving stairway comprising; a series of steps, each step having a chain wheel and a trailer wheel at each side thereof; a pair of semi-circular tracks at an end of the stairway on each side thereof for guiding the trailer wheels as the steps pass around the bend from one run to the other, the tracks of each pair being concentric and being spaced to provide sufficient clearance for said trailer wheels to roll thereon, the trailer wheels of each step shifting from one of their respective tracks to the other as the step reaches a point in going around the bend where the center of gravity of the step passes from one side to the other of a vertical plane through the axle for the chain wheels of that step; and means for retarding said shifting of said trailer wheels, said means comprising moving means associated with the trailer wheels of each step and stationary friction means for cooperating with said moving means to exert a drag on the trailer wheels as the step passes said point.

5. A moving stairway comprising; a series of steps, each step having a chain wheel and a trailer wheel at each side thereof; a pair of curved tracks at an end of the stairway on each side thereof for guiding the trailer wheels as the steps pass around the bend from one run to the other, the distance between the tracks of each pair being greater than the diameter of said trailer wheels, the trailer wheels of each step shifting from one of their respective tracks to the other as the center of gravity of the step passes from one side to the other of a vertical plane through the centers of the chain wheels of that step as the step goes around the bend; a friction device having a pair of jaws spring pressed toward each other; and a member carried by each of said steps for passing between said jaws as the center of gravity of the step passes to the other side of said plane, said jaws acting to retard said member to prevent the sudden engagement of each of the trailer wheels for said step with its said other track as it shifts thereto from its said one track.

6. A moving stairway comprising; a series of steps, each step having a chain wheel and a trailer wheel at each side thereof; a pair of semi-circular tracks at an end of the stairway on each side thereof for guiding the trailer wheels as the steps pass around the bend from one run to the other, the tracks of each pair being concentric and being spaced to provide sufficient clearance for said trailer wheels to roll thereon, the trailer wheels of each step shifting from one of their respective tracks to the other as the center of gravity of the step passes from one side to the other of a vertical plane through the axle for the chain wheels of that step as the step goes around the bend; a friction device having a pair of spring pressed jaws; and a member carried by each of said steps for passing between said jaws as the center of gravity of the step passes to the other side of said plane, said jaws acting to retard said member to prevent the sudden engagement of each of the trailer wheels for said step with its said other track as it shifts thereto from its said one track.

7. A moving stairway comprising; a series of steps, each step having a chain wheel axle with a chain wheel on each end thereof and a trailer wheel axle with a trailer wheel on each end thereof; means carrying the steps around the bend at one end of the stairway from one run to the other, said means including a pair of semi-circular tracks on each side of the stairway for guiding the trailer wheels, the tracks of each pair being concentric and being spaced to provide sufficient clearance for said trailer wheels to roll thereon, the trailer wheels of each step shifting from one of their respective tracks to the other as the center of gravity of the step passes from one side to the other of a vertical plane through the axle for the chain wheels of that step as the step goes around the bend; a stationary friction device having a pair of shoes biased toward each other; and a tongue carried by the trailer wheel axle of each of said steps for passing between said shoes as the center of gravity of the step passes to the other side of said plane, said shoes acting on said tongues to dampen the movement of the trailer wheels as their shift to their other tracks takes place.

SAMUEL GUSTAVE MARGLES.
ANDREW FABULA.